United States Patent
Bennai et al.

(10) Patent No.: US 7,031,298 B2
(45) Date of Patent: Apr. 18, 2006

(54) METHOD OF TRANSMITTING SIGNALING DATA

(75) Inventors: Lahcen Bennai, Argenteuil (FR); Christian Laroque, Frankfurt (DE)

(73) Assignee: Alcatel, Paris (FR)

( * ) Notice: Subject to any disclaimer, the term of this patent is extended or adjusted under 35 U.S.C. 154(b) by 776 days.

(21) Appl. No.: 09/736,158

(22) Filed: Dec. 15, 2000
(Under 37 CFR 1.47)

(65) Prior Publication Data
US 2002/0031112 A1 Mar. 14, 2002

(30) Foreign Application Priority Data
Jun. 25, 1998 (FR) .................................. 98 08065

(51) Int. Cl.
*H04L 12/66* (2006.01)
(52) U.S. Cl. .................. 370/352; 370/467; 370/394
(58) Field of Classification Search ................ 370/466, 370/467, 522–524, 352–354, 394
See application file for complete search history.

(56) References Cited

U.S. PATENT DOCUMENTS

| | | | | |
|---|---|---|---|---|
| 5,062,108 A | * | 10/1991 | Bales et al. | 370/467 |
| 5,115,431 A | * | 5/1992 | Williams et al. | 370/394 |
| 5,572,530 A | * | 11/1996 | Chitre et al. | 370/524 |
| 5,724,355 A | * | 3/1998 | Bruno et al. | 370/401 |
| 6,044,070 A | * | 3/2000 | Valentine et al. | 370/316 |
| 6,181,680 B1 | * | 1/2001 | Nagata et al. | 370/248 |
| 6,236,653 B1 | * | 5/2001 | Dalton et al. | 370/352 |
| 6,347,088 B1 | * | 2/2002 | Katou et al. | 370/395.2 |
| 6,411,797 B1 | * | 6/2002 | Estinto | 455/9 |

FOREIGN PATENT DOCUMENTS

| | | |
|---|---|---|
| CA | 2221218 | 6/1998 |
| EP | 0 769 882 A1 | 4/1997 |
| EP | 0 857 004 A2 | 8/1998 |
| WO | WO 99/05590 | 2/1999 |

OTHER PUBLICATIONS

Merlin House et al., "The QSIG Handbook," Aug. 1995, InterConnect Communications Ltd., First Edition, pp. 3, 50-51.*

* cited by examiner

*Primary Examiner*—Ricky Ngo
*Assistant Examiner*—Nittaya Juntima
(74) *Attorney, Agent, or Firm*—Sughrue Mion, PLLC

(57) ABSTRACT

To solve the problems of sending signaling signals (4) between exchanges (1, 6) which are interconnected by links (7) which have no facility for sending signaling signals conforming to the ISDN standard, the necessary signaling channel is simulated on a supplementary channel. In this case, the signaling data (4) formatted in accordance with the ISDN standard is converted into data formatted in accordance with said other channel on transmission and restored to its original format on reception. It is shown that this approach can overcome the hybrid nature of the links between two exchanges conforming to the ISDN standard. The exchanges include software conforming to the ISDN standard for which the link between exchanges becomes transparent.

8 Claims, 1 Drawing Sheet

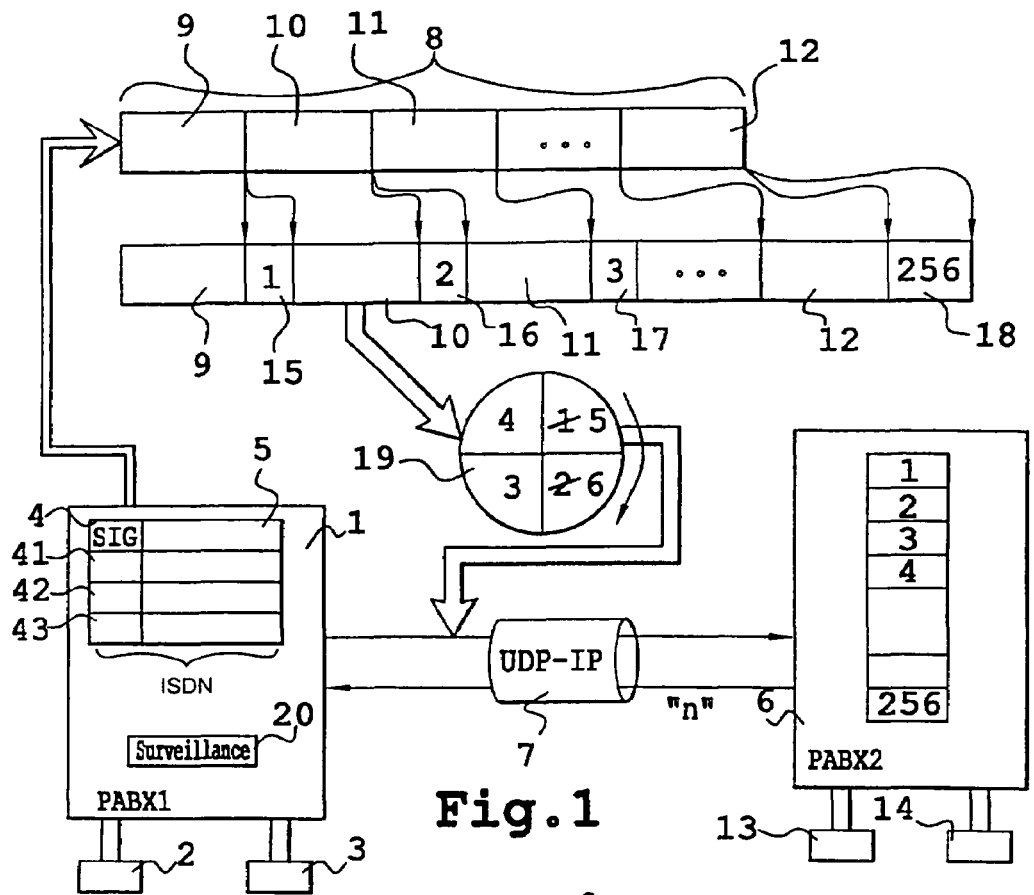
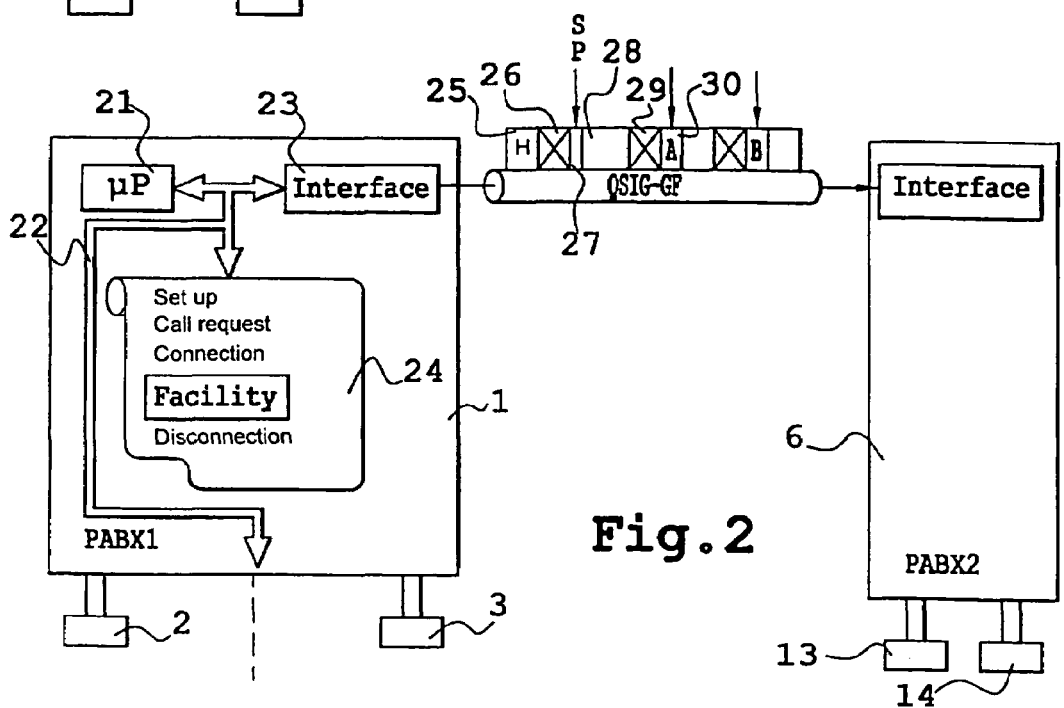

METHOD OF TRANSMITTING SIGNALING DATA

BACKGROUND OF THE INVENTION

The present invention relates to a method of transmitting signaling data. It can be used in the telephony art in particular to interconnect two exchanges, in particular two private exchanges.

Constituting transmission channels involving, in principle, physically, temporally or functionally reserving means for sending data and physically, temporally or functionally reserving complementary means for sending signaling signals is known in the telephony art. Signaling signals, or signaling in general, organize(s) the transfer of data on the other means. Thus data channels or signaling channels can be physically different channels, pairs of telephone wires in a multi-pair cable. They can equally be frequency allocations in an overall frequency band. Finally, from the functional point of view, they can be messages sent on a channel but whose destination is sometimes one person and sometimes another person, depending on signaling data contained in the message.

It is usual to distinguish between homogeneous access and hybrid access. With homogeneous access the channels used for data are of the same type as the channels used to send signaling. The invention is more particularly directed to hybrid access in which the channel types are different, although the invention can equally be adapted to suit homogeneous access.

If two exchanges are interconnected, it is necessary for them to use identical transaction protocols on their common communication channels. To this end, the ISDN standard relating to integrated services digital networks (ISDN) defines a protocol offering relatively high performance. Consequently, since the introduction of the ISDN standard, new exchanges have conformed to it.

However, in extant public networks in particular, some communication channels do not conform to the ISDN standard. This is because they were designed a long time ago, because their objectives are different to those addressed by the standard, or because their modes of use are then more efficient. Examples of such networks are Ethernet networks and QSig-GF networks.

A problem therefore arises because the equipment is not homogeneous, comprising exchanges that comply with the ISDN standard, on the one hand, and exchanges that do not comply with it, on the other hand. The problem lies in the fact that the ISDN standard defines a protocol for sending signaling signals relating to telephone calls to be set up or modified. In practice it is the definition of the protocol which causes the problem. It cannot be implemented in networks which do not conform to the ISDN standard. The ISDN protocol provides service access point identifier messages, comprising SAPI S messages for signaling and SAPI P messages for sending packets. When the exchange equipment is manufactured the problem therefore arises of the inability of the exchange to route calls conforming to its standardized protocol over a network of a type other that conforming to the standard, and in particular a network which does not accept signaling messages.

The invention solves this problem by converting the signaling data produced by the exchange in the standard ISDN format into signaling data in a format accepted by the channel. The format accepted by the channel includes the addition to the signaling data of information indicating that it is signaling data. Because the channel that is to be used does not make any distinction, a protocol that the invention determines in advance is used to advise it that the signaling messages are in fact signaling messages.

In more concrete terms, given the random nature of the requirement to send signaling messages (which are sent only when a call is set up between two parties or if the call conditions are modified), it would appear necessary to have a channel open at all times to convey the signaling messages. However, a channel that is open at all times consumes a great amount of resources, in particular if it does not carry a great amount of information. One kind of channel that is open at all times well known to the skilled person is an Ethernet network. An Ethernet network is designed to route packets of information fed to it. However, although it corresponds effectively to the requirements stated by exchange proprietors, from this point of view of permanent availability, an Ethernet network does not conform to the ISDN standard. The treatment to encapsulate data in order to transport it on Ethernet networks uses software that conforms to the UDP-IP (User Datagram Protocol—Internet Protocol) standard, for example. The UDP-IP standard is not structured like the ISDN standard and is not compatible with it. In particular, with the UDP-IP standard, the sending of information packets is not assured and their order of arrival is even less assured.

To solve this problem, the invention adds information representing the order of the packets to signaling packets sent over an Ethernet network. When a packet is received, an acknowledgment is sent to the sender. The acknowledgment includes the number of the last packet received. This tells the sender which information packets have not been received and must be sent again.

In another example, the channel used to send the signaling messages is a standard QSig-GF channel, which does not conform to the ISDN standard either. Unlike an Ethernet network, which does not have any signaling channel at all, standard QSig-GF networks include signaling channels. However, their signaling channels are capable of carrying only SAPI S messages, not SAPI P messages. Consequently, none of the SAPI P information generated by the exchanges in the context of ISDN calls can be routed.

In this case, the invention exploits the existence in the QSig-GF protocol of a particular kind of availability referred to as a "FACILITY" message and enabling any type of information to be transmitted within a FACILITY message, whilst still complying with a form of encapsulation specific to the QSig-GF standard. The invention therefore starts by setting up a call with no B channel between the two exchanges connected by a QSig-GF link. This call with no B channel can then be used to enable the two exchanges to interchange FACILITY messages relating to the call on the D channel and therefore to encapsulate signaling messages with a header corresponding to the QSig-GF standard.

SUMMARY OF THE INVENTION

The invention therefore provides a method of transmitting signaling data which relates to telephone access conforming to the ISDN standard and is transmitted on a channel that conforms to another standard and does not conform to the ISDN standard, which method is characterized in that it includes the following steps:

a channel is set up once and for all that conforms to another standard and does not conform to the ISDN standard, signaling data in the format of the ISDN standard is converted into data in a format accepted by the channel conforming to the other standard, the signaling data converted in this way is sent, and when it is received, the signaling data is converted reciprocally into signaling data to the ISDN standard format.

BRIEF DESCRIPTION OF THE DRAWINGS

The invention will be better understood after reading the following description and examining the accompanying drawing. The drawing is provided entirely by way of non-limiting example of the invention. In the drawing:

FIG. 1 is a diagram showing the implementation of the method according to the invention when the other standard is the USDP-IP standard, and FIG. 2 is a diagram of the same type as FIG. 1 when the other standard is the QSig-GF standard.

FIG. 1 illustrates a method according to the invention. It shows a private automatic branch exchange 1 (PABX1) which is connected to telephone equipment units 2 and 3. For simplicity it may be assumed that the units 2 and 3 are telephones or microcomputers. The design of the units 2 and 3 conforms to the ISDN standard, as does that of the exchange 1. In accordance with the ISDN standard, information which has a signaling part 4 and a message content part 5 is generated for all connections of a unit 2 to the exchange 1 or to another unit 3. In accordance with the ISDN standard, the signaling and message content parts 4 and 5 of the information are processed by different circuits. The circuits which process the signaling part 4 of the information have the particular object of setting up all the switchpaths needed to route messages between the units 2 and 3.

DETAILED DESCRIPTION OF THE INVENTION

The aim the invention is to connect the exchange 1 to another exchange 6 of the same type when the link 7 for connecting the two exchanges is of a different type and operates in accordance with a protocol other than that of the ISDN standard. In the example shown in FIG. 1, the link 7 uses an Internet protocol conforming to the UDP-IP standard. More generally, the link includes channels (not shown) for transmitting the message content parts 5 and a channel to the UDP-IP standard for transmitting the signaling parts 4 relating to the message content parts 5.

The invention converts the signaling information 4, which consists of data in the format of the ISDN standard, into a signaling message 8 in a format accepted by the channel 7 to the other standard. For example, signaling messages 4, 41, 42 and 43 can be encapsulated in UDP-IP packets 9 to 12. The packets 9 to 12 are encapsulated by control bits conforming to the UDP-IP standard. Under the UDP-IP standard, one message is inserted into each UDP-IP packet. There cannot be more than one signaling message in a UDP-IP packet. Moreover, a signaling message is not divided into several parts. According to the invention, the messages 8 encapsulated in this way are sent on the channel 7 and received in the exchange 6. In the exchange 6 the received messages 8 are converted into information of the signaling part 4 type conforming to the ISDN standard which can then be processed in the exchange 6 to enable the units 2 and 3 to be connected to other units 13 and 14 (possibly on another channel).

Because the UDP-IP protocol involves the risk of loss of packets, and most importantly the risk of the order of the packets 9 to 12 being reversed, an improvement to the invention modifies the message 8 formatted to the UDP-IP standard by adding packet order information to it. In the structure of the message 8, the construction of the successive data blocks (blocks 9 to 12) is modified. Packet order information is added to each block. The packet order information occupies one byte, for example, covering packet numbers from 0 to 255. The packet number is then incorporated into the message 8 in a respective area 15 to 18 placed before or after each block 9 to 12. The packet number forms an integral part of each send block (i.e. each block to be sent). In this case, in accordance with the invention, it is the send block consisting of a block 9 and its number 15 that must conform to the UDP-IP standard. The successive send blocks are then sent to the other exchange 6. The latter receives them and sends back to the exchange 1 an acknowledgment essentially representing the number of the last send block that has been received and corresponding to a continuous stream of send packets that have been received.

In one example, this sending is affected by means of a circular memory 19 which has four locations for loading four send blocks, for example. Thus send blocks 1, 2, 3 and 4 are loaded. The four send blocks are then sent in turn to the exchange 6 via the channel 7. The memory 19 can be loaded as and when the blocks are sent. The exchange 6 may then, for example, depending on transmission conditions that apply, determine that it has received blocks 1 and 2, that it has not received block 3 and that it has received block 4. In this case, the exchange 6 sends an acknowledgment to the exchange 1 indicating the block number 2 (n=2). This means that the blocks have been received continuously up to block 2.

In this case the exchange 1 can load the circular memory 19 with subsequent blocks 5 and 6 instead of the blocks 1 and 2 already received. The content of the memory 19 will then consist of the blocks 3, 4, 5 and 6. Accordingly, when the exchange 1 loads the circular memory 19 with the blocks 5 and 6, only these two blocks are sent. After block 6 is sent, it is necessary to send block 3 again if no acknowledgment citing a block number greater than or equal to 3 has been received after a time-out. A block is sent when it is present in the circular memory and the block already sent has not been acknowledged after a time-out. In this way the block 3 is sent, and possibly the block 4. Note that the block 4 can be sent a second time, even though it has already been received (after it was sent the first time), because the time-out can end before the acknowledgment for block 3 is received (or even for block 6, as both these blocks have been sent). Thus the circular memory 19 is loaded and blocks are sent as and when acknowledgments are received. If no acknowledgment is received after a given time-out all of the content of the circular memory is sent again. Thus, if no other acknowledgment has been received since the acknowledgment citing block number 2, blocks 3, 4, 5 and 6 can be sent a second time. It is also possible for block 3, which has not previously been received in time, to reach the exchange 6 late, although by then the exchange has already received block 3 (after it was sent the second time). In this case, the block that was sent is merely received twice over. It is set aside and is not processed a second time.

According to another improvement to the invention, the functionality of the channel 7 is tested continuously by sending surveillance messages 20 which simply take the form of a signaling block 1 that is sent at a period adopted for testing the functionality of the channel 7. For example, it can be sent approximately every 15 seconds. If the acknowledgment 1 which concerns it is received, the channel is deemed to be functional. If not, after a particular number of attempts, the channel 7 is declared deficient and an alert procedure is undertaken. The same applies if an expected block n is never received.

Given that only one byte is used to convey the block order information, the number of a send block cannot be greater than 255. This is not a problem because if the number of blocks is greater than 255 it is sufficient to start counting again from 0 when 255 is reached. In this case, the circular memory need only include a number of blocks significantly less than 256.

FIG. 2 shows similar elements to FIG. 1, but for the QSig-GF protocol, which does not conform to the ISDN standard either. The figure also shows the exchange 1 in a little more detail. The exchange includes a microprocessor 21 connected by a bus 22 to the units 2–3, a QSig-GF format interface 23 and a program memory 24 containing in particular a program for formatting messages to the format conforming to the QSig-GF standard. The same applies to FIG. 1 with regard to the UDP-IP standard. The program 24 provides a particular mode of use including a call request procedure, a connection procedure, a procedure for sending free messages (FACILITY messages) and a disconnection procedure. In accordance with the invention, the microprocessor 21 launches a working session of the interface 23 so that it calls the exchange 6 by setting up a call with no B channel, connects to it and remains connected to it. Automatic disconnection time-outs are eliminated if necessary. The call set up with no B channel is set up via the D channel of the QSig-GF bundle. It is referred to as a support call. In accordance with the invention, FACILITY messages are sent on the D channel by encapsulating the ISDN signaling (SAPI S and SAPI P messages) in FACILITY messages carried by the support call. FACILITY messages are exchanged between the exchange 1 and the exchange 6 transparently. The transfer can continue for as long as the support call is active.

In this mode, messages to be sent on the QSig-GF format channel must essentially include a header 25. In practice, the header 25 occupies one byte. This first byte is a facility information element (EI FACILITY). It contains four types of information. A first type of information advises the length of the facility message.

The header also contains a protocol discriminator, references of the support call request and the message type. In fact, in this instance, the message type is always the FACILITY type.

An area 26 of the FACILITY message following on from the header area 25 contains a header specific to the message. In a subsequent area 27, the nature of the message (SAPI S or SAPI P) is indicated by a code corresponding to S or P. Signaling messages 4 are sent in a subsequent free area 28, and consist of the information previously referred to. If the resulting message conforming to the QSig-GF protocol is longer than the 128 bytes available in a normal FACILITY message frame (from which the headers and areas 26 and 27 must be deducted, incidentally), the length indicated in the part 25 must include an indication that the FACILITY message continues beyond the 128 bytes. In this case, the message includes a part 29 and a part 30. The part 29 is identical to the part 26. The part 30 is substituted for the indication relating to the nature of the message (SAPI S or SAPI P). However, it includes in practice an indicator of the order of the length extension (the additional length over and above the normal length). In this example, the part 30 could contain information A, then information B, and so on; depending on the length of the signaling message to be transmitted, length information 25 is provided and markers A, B are inserted into the message.

The signaling data to be transmitted in accordance with the invention comprises flow control data, security data and, essentially, message scheduling data. According to the invention, the information part 5 can be sent between the exchanges 1 and 6 via other channels, in a manner that is known or unknown. The units 2 and 3 can also be connected to the units 13 and 14 by UDP-IP or QSig-GF channels. The channels, although of the same type as the channels used to transmit signaling, are nevertheless different. Thus signaling and messages are not sent at the same time on the same channel.

The invention claimed is:

1. A method of transmitting signaling data, which relates to a telephone connection having both signaling data and message content parts, said signaling data conforming to the ISDN standard and being transmitted on a first channel that conforms to the UDP-IP standard and does not conform to the ISDN standard, which method is characterized in that it includes the following steps:

converting said signaling data in the format of the ISDN standard into data in a format accepted by the first channel, sending the signaling data converted in this way over said first channel, and when it is received, converting the signaling data reciprocally into signaling data conforming to the ISDN standard format, said method being further characterized in that:

the signaling data to be transmitted is formatted into successive data blocks, send blocks are constructed from said successive signaling data blocks by adding to them information on the order of the blocks, the send blocks are sent from a unit connected to one end of the first channel, the send blocks are received in another unit connected to the other end of the first channel, send blocks that have been received are tested in said another unit, and said other unit sends an acknowledgment signal (n) designating the highest numbered send block that has been received and belongs to a continuous series of send blocks.

2. A method according to claim 1, characterized in that: surveillance signals (20) are sent periodically on said first channel, and correct operation of said first channel is tested.

3. A method according to claim 1, wherein said signaling data comprises flow control data, security data and message scheduling data.

4. A method according to claim 1, characterized in that data messages of said message content parts are sent on a second channel other than said first channel.

5. A method of transmitting signaling data, which relates to a telephone connection having both signaling data and message content parts, said signaling data conforming to the ISDN standard and being transmitted on a first channel that conforms to the QSig-GF standard and does not conform to the ISDN standard, which method is characterized in that it includes the following steps:

converting said signaling data in the format of the ISDN standard into data in a format accepted by said first channel, sending the signaling data converted in this way over said first channel, and when it is received, converting the signaling data reciprocally into signaling data conforming to the ISDN standard format, said method being further characterized in that:

a link is established that conforms to the QSig-GF standard, said link is configured in a FACILITY mode of said QSig-GF standard, and the signaling data to be transmitted is formatted to occupy free segments of messages generated in accordance with the FACILITY mode of said QSig-GF standard.

6. A method according to claim 4, characterized in that:

surveillance signals (20) are sent periodically on said first channel, and correct operation of said first channel is tested.

7. A method according to claim 4, wherein said signaling data comprises flow control data, security data and message scheduling data.

8. A method according to claim 4, characterized in that data messages of said message content parts are sent on a second channel other than said first channel.

* * * * *